United States Patent [19]

Ueda et al.

[11] Patent Number: 5,351,315
[45] Date of Patent: Sep. 27, 1994

[54] APPARATUS FOR SMOOTHING OUTLINES OF IMAGES

[75] Inventors: Naofumi Ueda, Yokohama; Yoshiaki Hanyu, Tokyo, both of Japan

[73] Assignee: Ricoh Company, Ltd., Tokyo, Japan

[21] Appl. No.: 900,448

[22] Filed: Jun. 18, 1992

Related U.S. Application Data

[63] Continuation-in-part of Ser. No. 654,592, Feb. 13, 1991.

[30] Foreign Application Priority Data

Feb. 21, 1990 [JP] Japan .................................. 2-16305

[51] Int. Cl.$^5$ .............................................. G09G 1/06
[52] U.S. Cl. ...................................... 382/54; 345/135; 345/136
[58] Field of Search ................... 382/54; 340/728, 747, 340/723, 730; 346/108; 345/135, 136, 144

[56] References Cited

U.S. PATENT DOCUMENTS

| | | |
|---|---|---|
| 4,591,844 | 5/1986 | Hickin et al. . |
| 4,672,369 | 6/1987 | Preiss et al. .......................... 340/728 |
| 4,679,039 | 7/1987 | Neil et al. . |
| 4,763,119 | 8/1988 | Matsubara et al. . |
| 5,041,848 | 8/1991 | Gilbert et al. . |
| 5,086,481 | 2/1992 | Yoshida et al. ....................... 340/728 |
| 5,122,884 | 6/1992 | Gilbert et al. ........................ 346/108 |
| 5,150,108 | 9/1992 | Markham ............................. 340/728 |

FOREIGN PATENT DOCUMENTS

3508606 12/1985 Fed. Rep. of Germany .
32-24268 2/1957 Japan .

Primary Examiner—Stephen Chin
Assistant Examiner—Timothy J. May
Attorney, Agent, or Firm—Mason, Fenwick & Lawrence

[57] ABSTRACT

An image processing apparatus includes a detection part for detecting an inclination of an outline from an image data stored in a memory, a dot counting part responsive to the detected inclination of the outline from the detection part for calculating selectively the number of successive dots aligned along a horizontal line and ending with a change of one dot in a vertical direction or the number of successive dots aligned along a vertical line and ending with a change of one dot in a horizontal direction and for supplying a counted number of successive dots, and a correction part for generating a plurality of correction dots which are arranged along a new horizontal line vertically changed by one dot from the horizontal line or a new vertical line horizontally changed by one dot from the vertical line on the basis of the counted number from the dot counting part and for supplying the plurality of correction dots to an output memory so as to produce a visually smooth outline in the output memory.

8 Claims, 9 Drawing Sheets

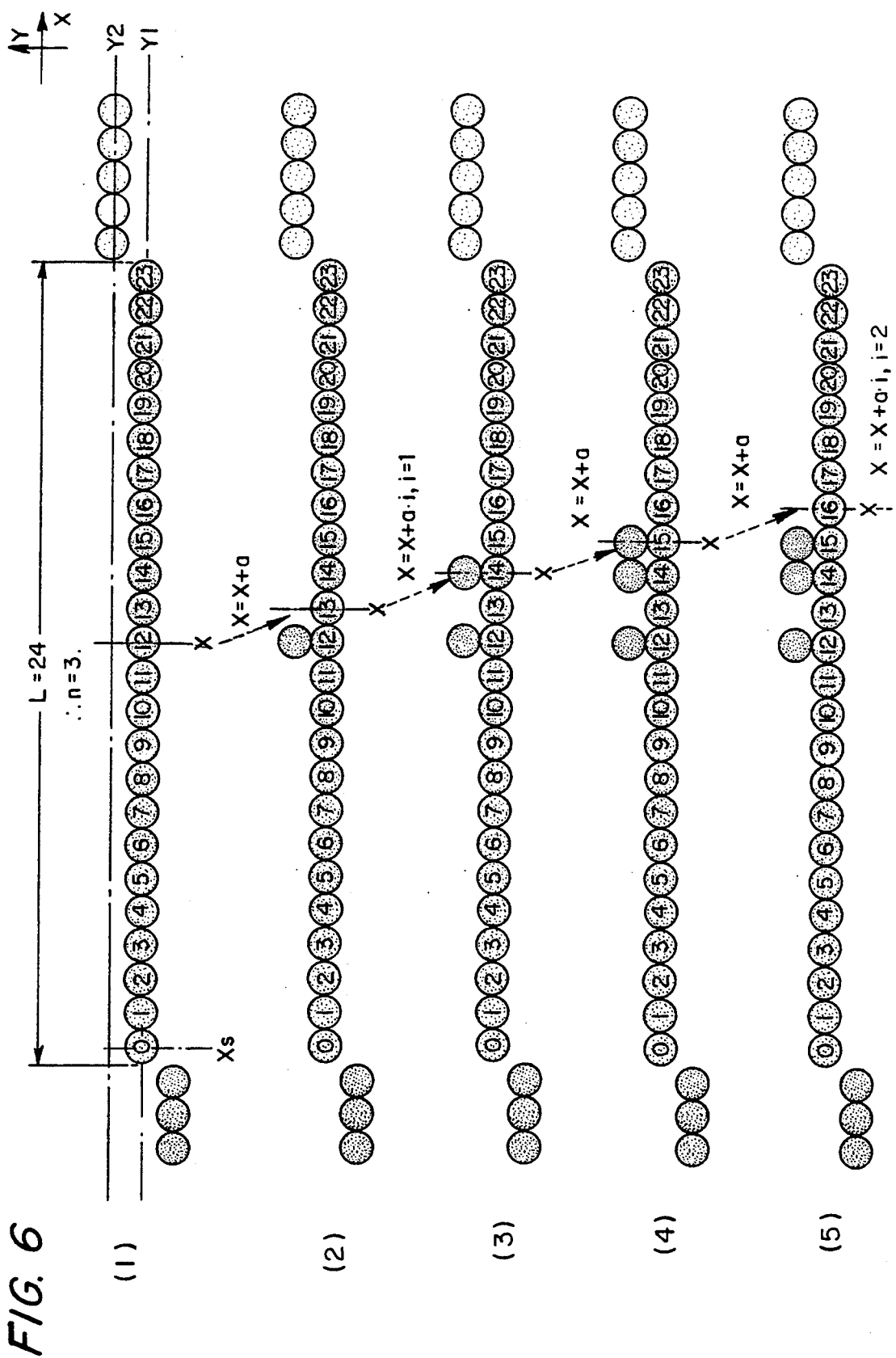

APPARATUS FOR SMOOTHING OUTLINES OF IMAGES

This application is a continuation-in-part of application Ser. No. 07/654,592, filed Feb. 13, 1991, the parent patent application being incorporated herein by reference as if reproduced in full below.

BACKGROUND OF THE INVENTION

The present invention generally relates to an image processing apparatus, and more particularly to an image processing apparatus for smoothing an outline of an image to be processed and outputting a set of correction dots to an output device, so as to produce a visually smooth outline of the image in the output device.

When an image data including graphics and character information is processed and output to an output device, the image data supplied to the output device is usually made up of a matrix of dots arranged in a regular-manner horizontally and vertically. FIG. 1A is an enlarged view showing an example of the output image data including horizontal and vertical rows of dots. An edge portion of an output image, which is inclined with respect to a horizontal or vertical direction, often shows stair-like irregularity that would be appreciable to the human eyes when the image is reduced back to the original size. Such stair-like irregularity is hereinafter called an aliasing. A conceivable method for eliminating such stair-like irregularity from the edge portion of the image (this method is hereinafter called anti-aliasing) is to add suitable gradation dots to each related dot of the edge portion of the image as shown in FIG. 1B so that the output image would show a visually smooth outline with no irregularity. Such a conventional image processing apparatus is disclosed, for example, in Japanese Laid-Open Patent Application No. 57-24268. However, there is a problem in that the conventional image processing apparatus in which gradation dots or halftone dots suitable for being added to the output image requires the use of a complicated control unit for processing such an image data including the gradation dots by executing complicated calculations for an outline smoothing process. And, the conventional apparatus must be provided with an image data memory having a relatively large capacity for storing additional gradation data as well as the image data, and an output device to which the image data is supplied from the conventional image processing apparatus must have a complicated output control and function for outputting the tone dots supplementary to the image data including stair-like irregularity or aliasing.

SUMMARY OF THE INVENTION

Accordingly, it is a general object of the present invention to provide an improved image processing apparatus in which the above described problems are eliminated.

Another and more specific object of the present invention is to provide an image processing apparatus which can smooth an edge portion of image data and supply a visually smooth outline of the image data appropriately with no complicated control unit. The above described object of the present invention is achieved by an image processing apparatus which includes a detection part for measuring a quantitative degree of inclination of an outline which is inclined with respect to a predetermined direction, and for outputting a measured quantitative inclination of the outline, a dot counting part, responsive to the measured quantitative inclination supplied from the detection part for selectively calculating: a) the number of successive dots aligned along a horizontal line and ending with a change of one dot in a vertical direction; or b) the number of successive dots aligned along a vertical line and ending with a change of one dot in a horizontal direction, and a correction part for: a) generating, based on the calculated number of successive dots calculated by the dot counting part, a plurality of correction dots which are arranged: 1) along a new horizontal line lying immediately above or below the horizontal line; or 2) along a new vertical line lying immediately to the left of or immediately to the right of the vertical line; and b) supplying the plurality of correction dots to an output memory so as to produce a visually smooth outline of of the image data in the output memory, wherein the plurality of correction dots generated by the correction means have a plurality of sets of dots, each set of dots being placed along either the new horizontal line or the new vertical line and separated from each other by different intervals. According to the present invention, it is possible to eliminate undesired aliasing from an edge portion of an image so that a visually smooth outline is produced in an output memory. The number of dots of the edge portion indicated by the count length L which is counted in accordance with the inclination of the outline, a set of correction dots is produced on the basis of the detected number of dots, and the outline having aliasing is corrected by adding the correction dots to the edge portion so as to produce a visually smooth outline of the image.

Other objects and further features of the present invention will be apparent from the following detailed description when read in conjunction with the accompanying drawings.

DESCRIPTION OF THE PREFERRED EMBODIMENT

Figure 1A:
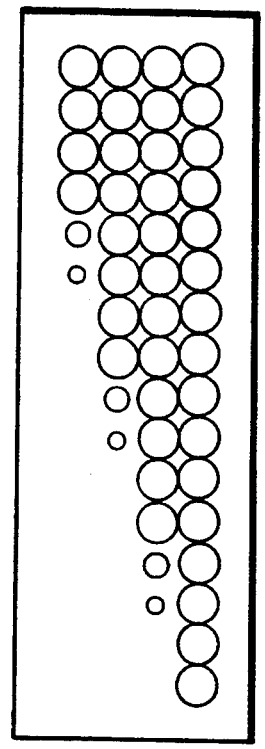
FIGS. 1A and 1B are diagrams for explaining an anti-aliasing process performed by a conventional image processing apparatus.
Figure 1B:
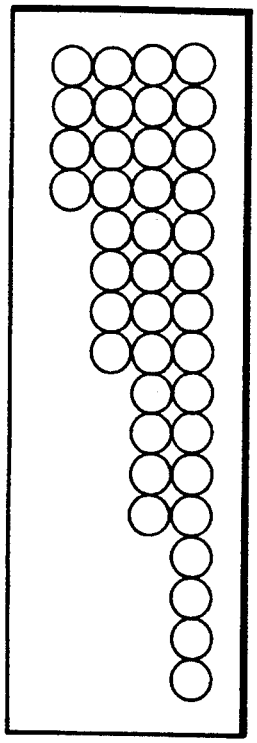
Figure 2:
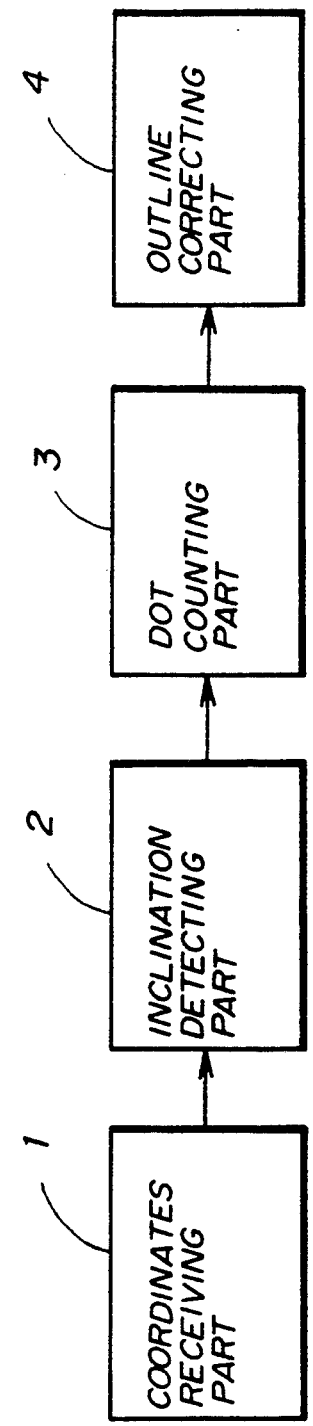
FIG. 2 is a block diagram showing an embodiment of an image processing apparatus according to the present invention.

A description will now be given of an embodiment of an image processing apparatus according to the present invention, with reference to FIG. 2. FIG. 2 shows an embodiment of the image processing apparatus according to the present invention. This image processing apparatus smoothes an edge portion of an image, and outputs binary data indicating a visually smooth outline to an output device. The output device is, for example, a display or a printer which is capable of processing binary image data. The image processing apparatus of the present invention generally has a coordinates receiving part 1, an inclination detecting part 2, a dot counting part 3 and a correction part 4. The coordinates receiving part 1 receives, from an input device, image data including x and y coordinates of a starting point and an end point of the edge portion of the image. After binary data indicative of the input image is generated and the binary data is stored in a memory (not shown), the inclination detecting part 2 detects an inclination of the edge portion from the binary data indicating the image and produces dot data from the x and y coordinates supplied by the coordinates receiving part 1. The dot counting part 3 calculates selectively the number of dots aligned in a horizontal direction with respect to a change in y coordinate of the edge portion, or the number of dots aligned in a vertical direction with respect to a change in x coordinate of the edge portion, on the basis of the detected inclination of the edge portion supplied by the inclination detecting part 2. The correction part 4 produces a set of correction dots on the basis of the calculated number of dots supplied by the dot counting part 3. The correction part 4 adds the set of correction dots to the edge portion so as to eliminate irregularity from the image, and produces a visually smooth outline of the image in the output device.

Figure 3A:
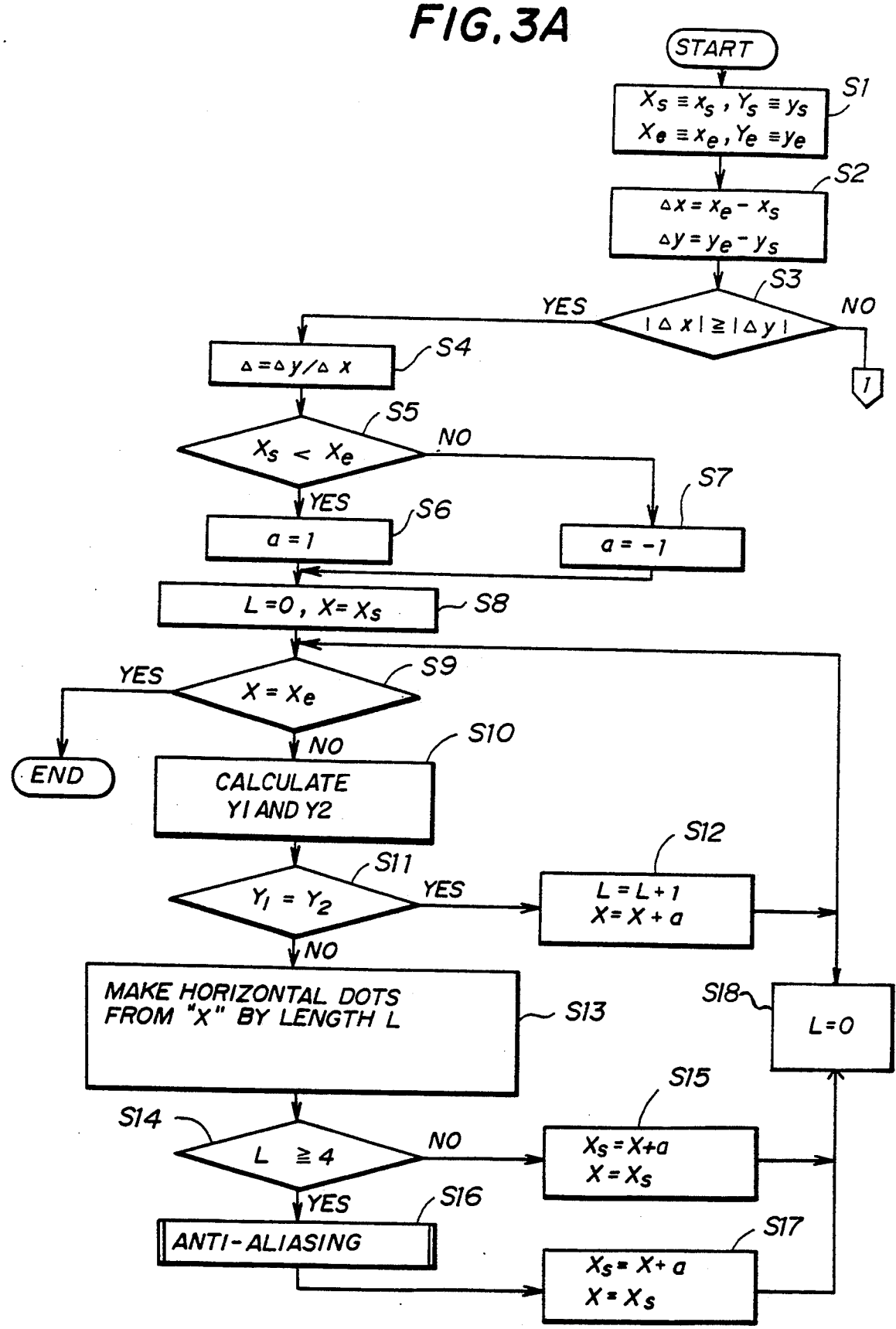
FIGS. 3A and 3B are flow charts for explaining an image processing process performed by the image processing apparatus shown in FIG. 2.
Figure 3B:
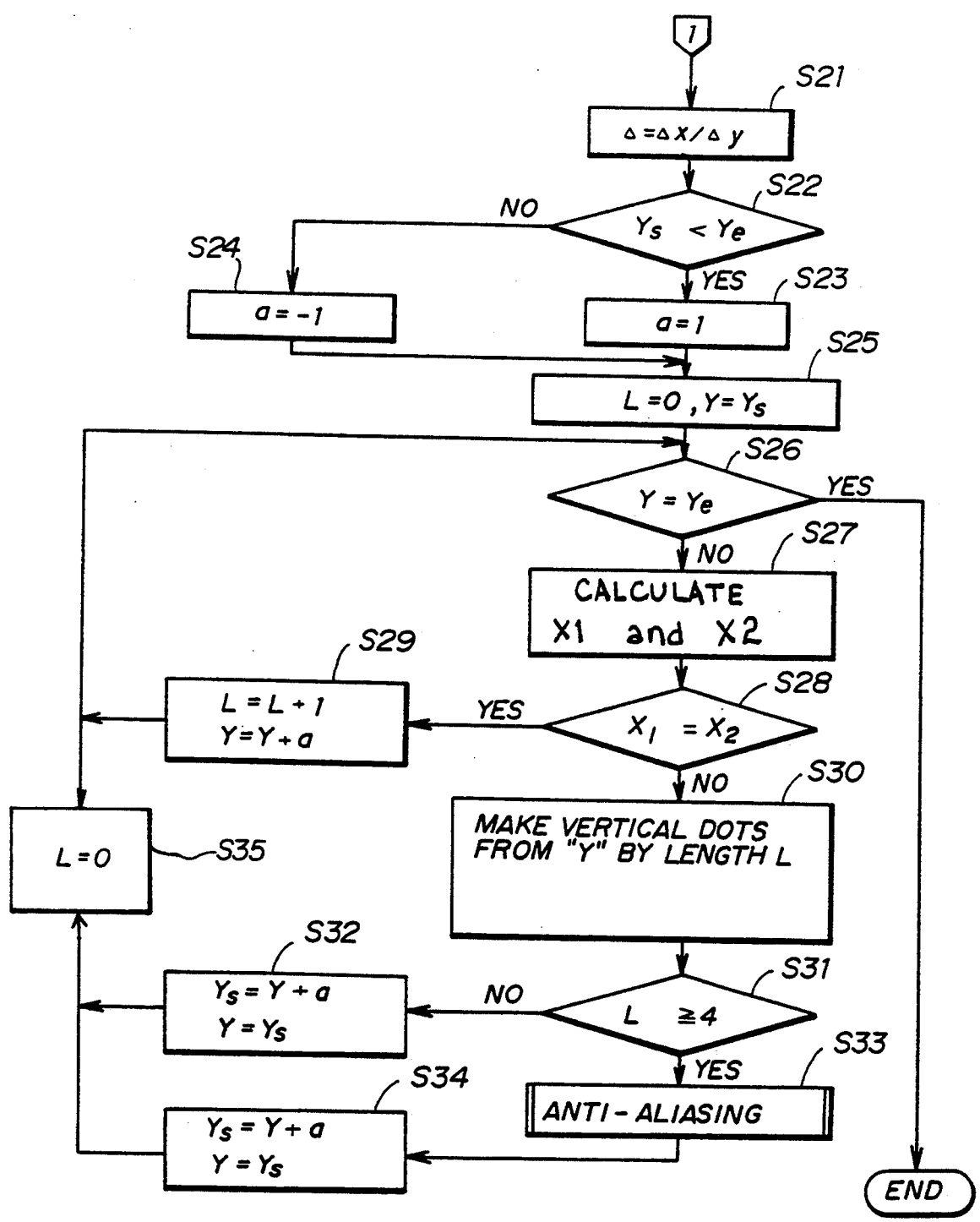
Figure 4:
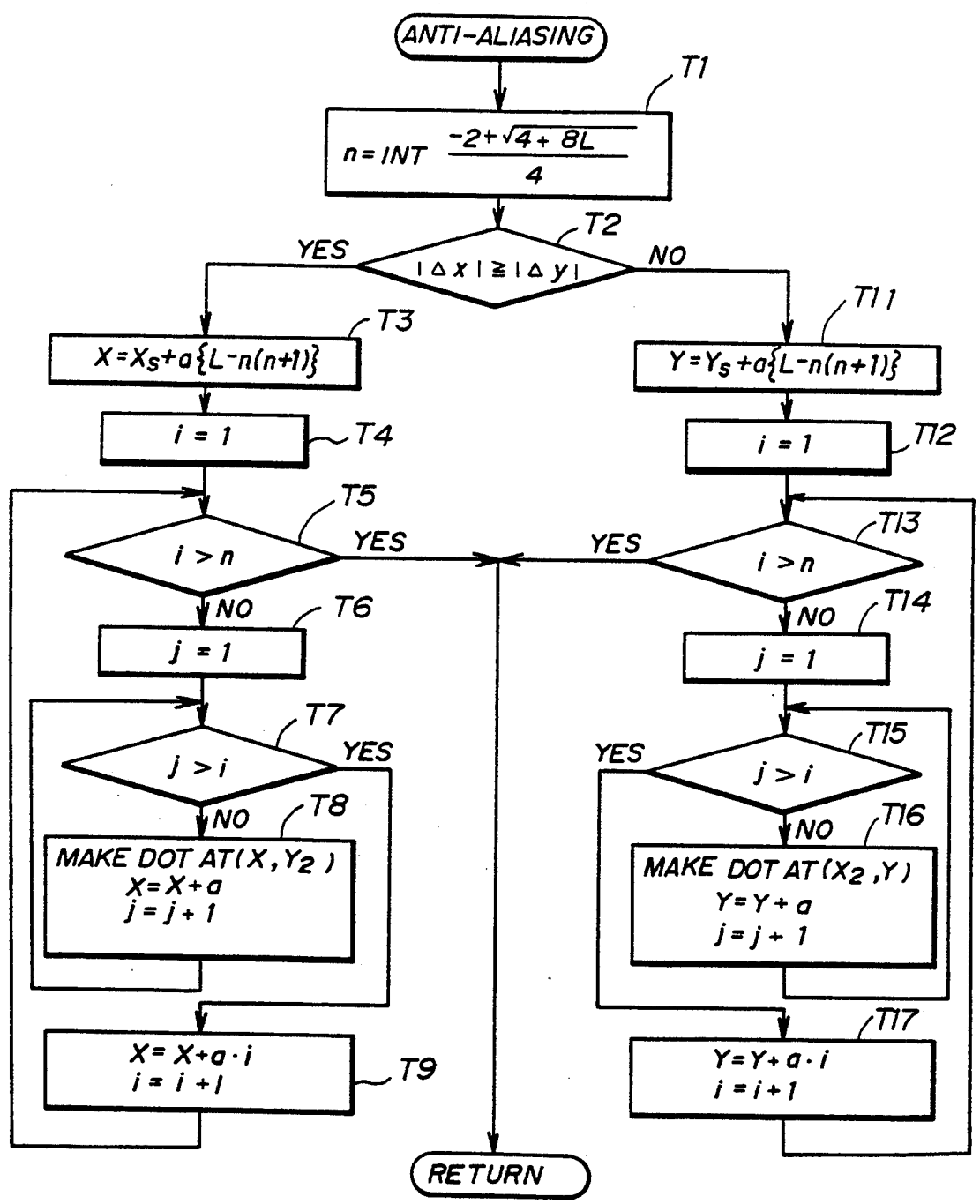
FIG. 4 is a flow chart for explaining an anti-aliasing process performed within the image processing process of FIGS. 3A and 3B.

Next, a description will be given of the image processing process performed by the image processing apparatus described above. FIGS. 3A and 3B show a coordinates receiving procedure performed by the coordinates receiving part 1, an inclination detecting procedure by the inclination detecting part 2, and a dot counting procedure by the dot counting part 3. FIG. 4 is a flow chart for explaining an anti-aliasing procedure performed by the correction part 4.

Figure 7A:
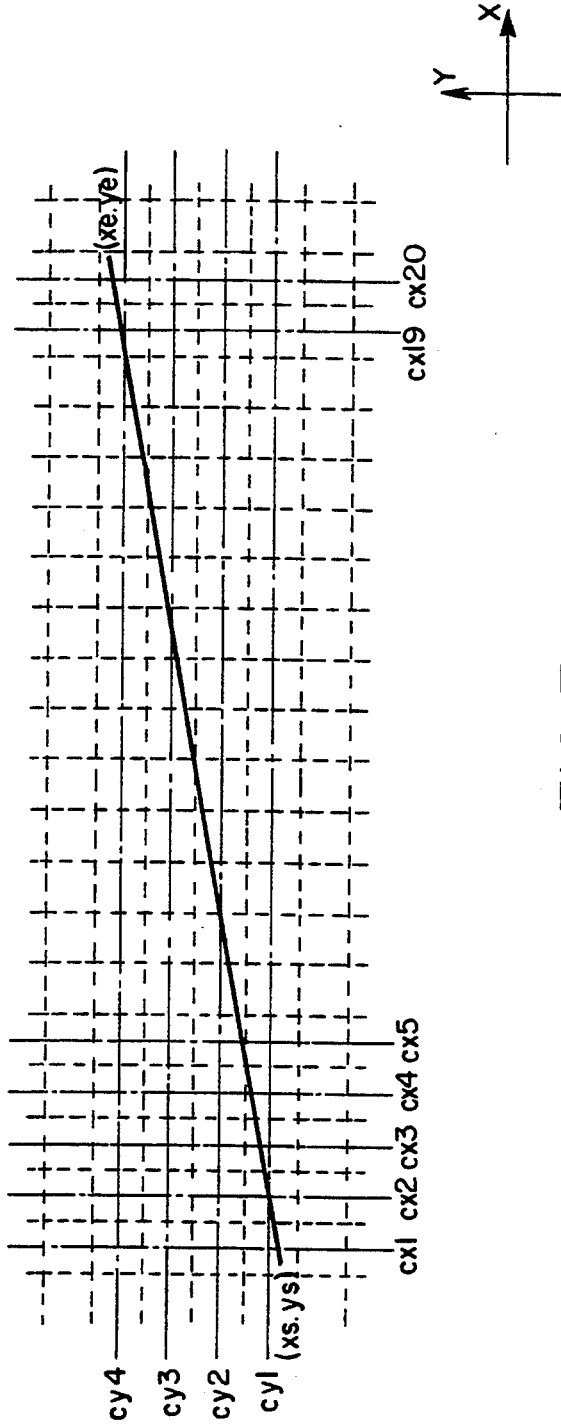
FIGS. 7A and 7B are diagrams showing a set of horizontal successive dots when an edge portion of an image with an inclination lying between −45 deg and +45 deg is given.
Figure 7B:
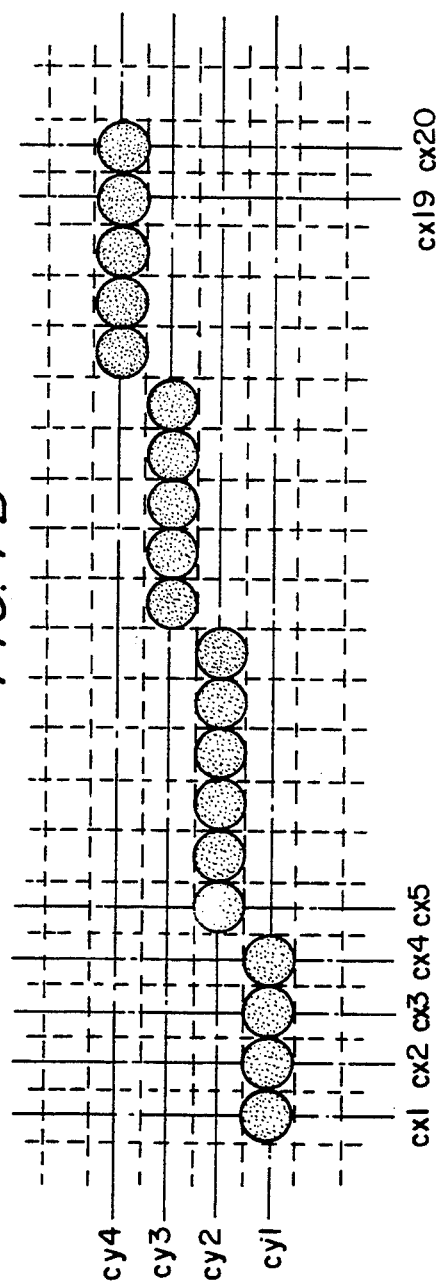

FIGS. 7A and 7B show a vector data which is given as an edge portion of an image. This vector data includes a set of x and y coordinates of a starting point of the edge portion and an end point thereof.

Generally, the starting point and the end point in the vector data are expressed in real number coordinates (xs, ys) and (xe, ye), respectively. In order to output binary image data to the output device capable of processing binary image data, it is necessary that these real number coordinates of the starting point and the end point are transformed into device coordinates expressed in integer numbers. The output image data is represented by the integer-number device coordinates, and the image data indicates a set of dots, the center points of which have integer number coordinates. This transformation is performed to form the set of dots having a resolution appropriate for a resolution of the output device. For the sake of convenience, the output device has a resolution in the x-axis direction (in the horizontal direction) that is the same as a resolution in the y-axis direction (in the vertical direction). This resolution of the output device is determined depending on the number of distinguishable dots per unit distance indicated by the output device. The transformation of real number coordinates (x, y) into integer number coordinates (X, Y) as described above is hereinafter called a device coordinate transformation, and this transformation in this specification is represented as follows.

$$X \equiv x, Y \equiv y.$$

In this formula, x and y (lower-case letters) are values of real number coordinates before the device coordinate transformation, X and Y (upper-case letters) are values of integer coordinates after the device coordinate transformation.

When the vector data is given with the starting point (xs, ys) and the end point (xe, ye) shown in FIG. 7A, a set of dots shown in FIG. 7B are produced through the above described transformation. The center points of the dots have integer number coordinates, and integer values of the x and y coordinates described by the vector data correspond with intersections between horizontal lines cy1, cy2, cy3, cy4 and vertical lines cx1, cx2, ..., cx20, the lines being indicated by dotted chain lines in FIG. 7B. Dotted lines shown in FIG. 7B indicate guide lines with a ±0.5 coordinate difference from each of the center points, and each dot is inscribed between the two adjacent guide lines. The starting point and the end point of the edge portion of the image have the integer values of x and y coordinates (Xs, Ys) and (Xe, Ye) respectively.

In FIG. 3A, a step S1 carries out the device coordinate transformation to transform values of x and y coordinates (real number) of the vector data into values of X and Y device coordinates (integer number). The real number coordinates (xs, ys) of the starting point of the edge portion are transformed into integer device coordinates (Xs, Ys), and the real number coordinates (xe, ye) of the end point thereof are transformed into integer device coordinates (Xe, Ye), respectively. A step S2 calculates a difference Δx (=xe−xs) in x coordinate (expressed in real number) between the starting point and the end point, and a difference Δy (=ye−ys) in y coordinate (expressed in real number) therebetween. These steps S1 and S2 are carried out by the coordinates receiving part 1 described above.

A step S3 determines whether the aliasing of the edge portion lies in horizontal direction (in x axis direction) or in vertical direction (in y axis direction) by comparing an absolute value of the x-coordinate difference Δx (=xe−xs) with an absolute value of the y-coordinate difference Δy (=ye−ys). In order to perform the dot counting procedure by means of the dot counting part, it is necessary to detect whether or not the inclination of the edge portion lies between 45 deg and 135 deg (or, between 225 deg and 315 deg) with respect to the horizontal direction (the x-axis direction).

Figure 8C:
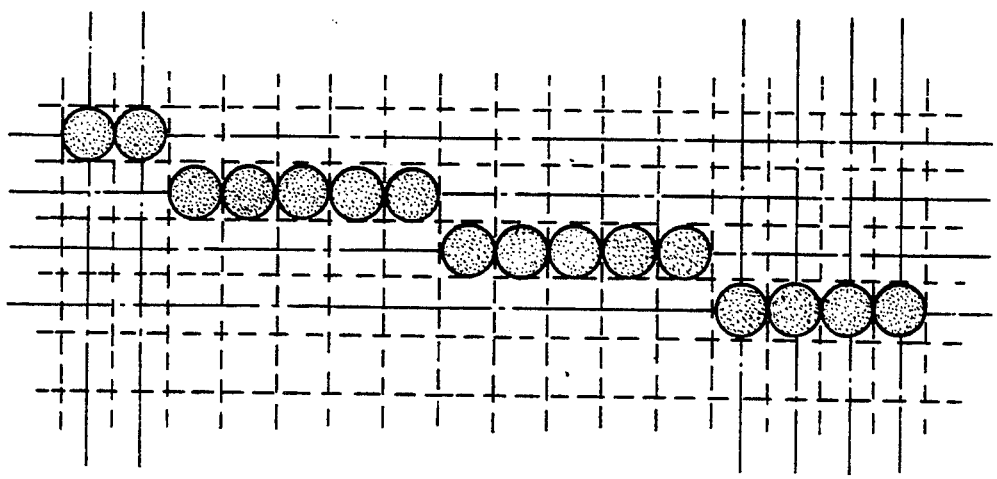
FIGS. 8A through 8C are diagrams showing a set of vertical successive dots when an edge portion of an image with an inclination lying between 45 deg and 135 deg is given.
Figure 8B:
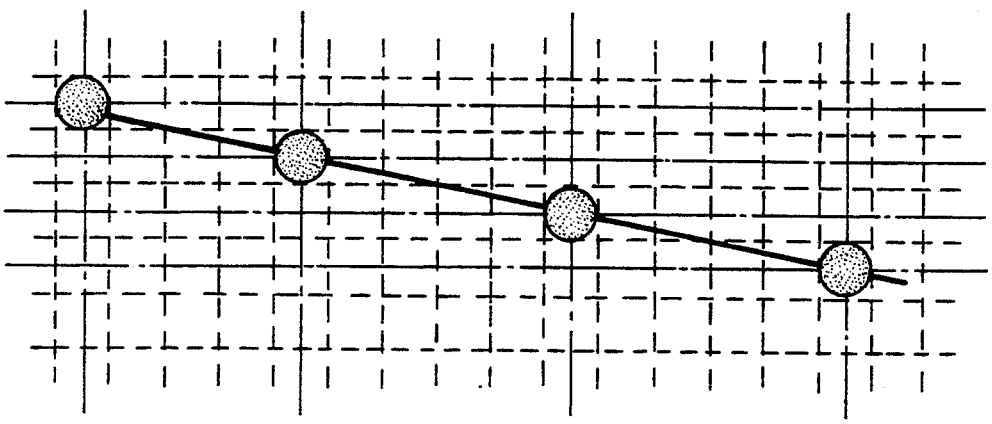
Figure 8A:
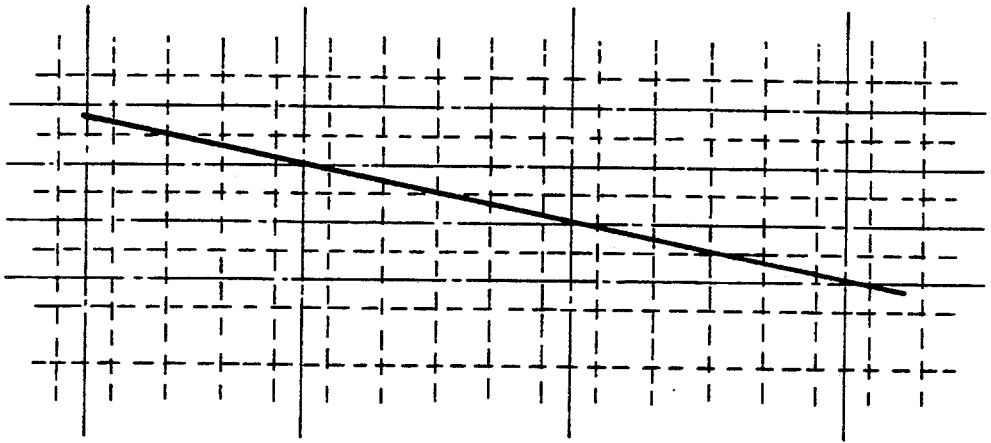

FIG. 8A shows vector data in which an edge portion of an image with an inclination lying between 45 deg and 135 deg is given. In this case, a set of dots shown in FIG. 8B, which are excessively spaced from each other and intermediate dots are missing, are generated if values of y coordinate of the edge portion are calculated by incrementing values of x coordinate thereof. In order to eliminate this problem, a set of dots are generated by calculating the values of x coordinate of the outline by incrementing the values of y coordinate thereof in the case of FIG 8A. If the dot counting is performed in this manner, a set of dots with no missing intermediate dots is generated as shown in FIG. 8C. According to the present invention, the values of x coordinate of the edge portion are calculated by incrementing the y coordinate value as the reference value of the edge portion (step S21: $\Delta = \Delta x/\Delta y = (xe-xs)/(ye-ys)$) when the inclination of the edge portion lies between 45 deg and 135 deg (or, between 225 deg and 315 deg) with respect to the horizontal direction. When the inclination of the edge portion lies between $-45$ deg and $+45$ deg (or, between 135 deg and 225 deg) with respect to the horizontal direction, the values of y coordinate of the edge portion are calculated by incrementing the x coordinate value as the reference value of the edge portion (step S4: $\Delta = \Delta y/\Delta x = (ye-ys)/(xe-xs)$).

Figure 5A:
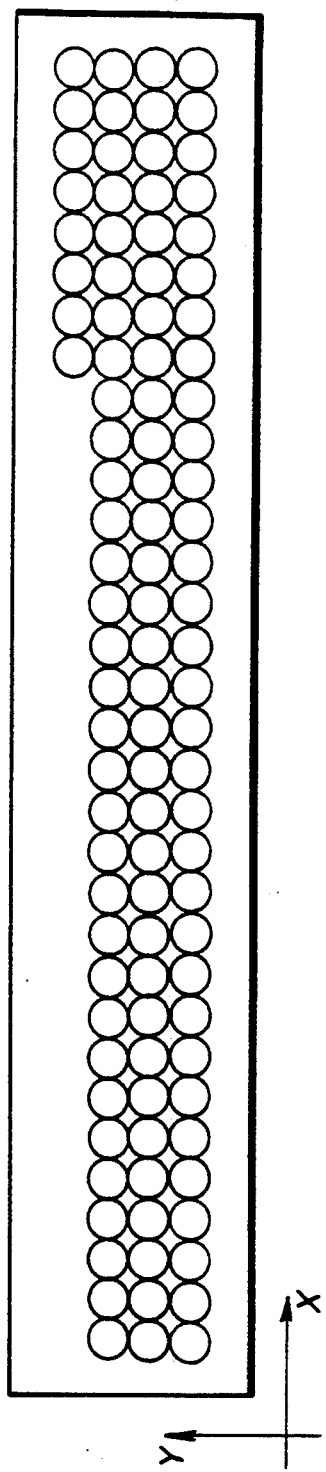
FIG. 5A is a diagram showing an edge portion of image data with aliasing.
Figure 5B:
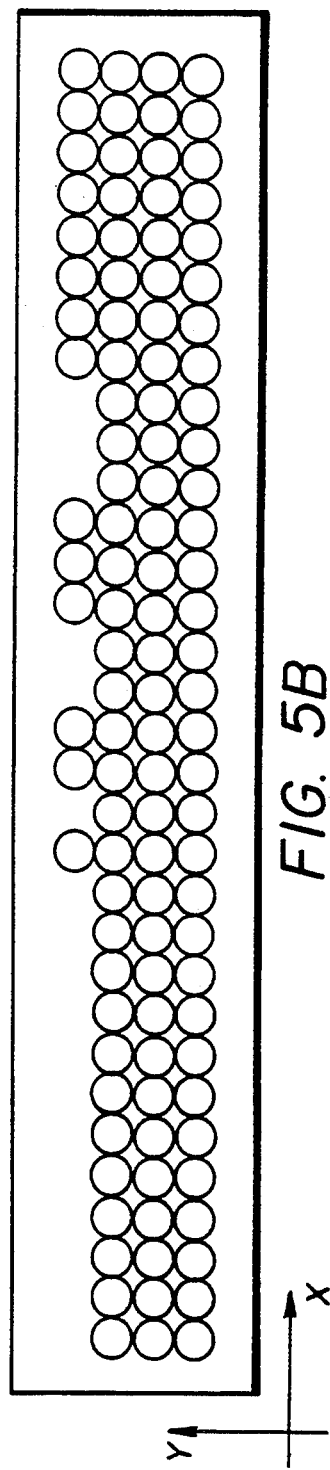
FIG. 5B is a diagram showing the edge portion after the anti-aliasing process is performed.

For the sake of convenience, the second case in which the absolute value of the x coordinate difference $(xe-xs)$ is greater than the absolute value of the y coordinate difference $(ye-ys)$ in the edge portion shown in FIG. 5A will be described below. The edge portion in this case has an inclination lying between 0 deg and $+45$ deg with respect to the horizontal direction. The absolute value of the difference $\Delta x=(xe-xs)$ is greater than the absolute value of the difference $\Delta y=(ye-ys)$, and the aliasing lies in vertical direction. The determination in step S3 allows steps S4 through S18 shown in FIG. 3A to be performed. A step S4 calculates a value of the inclination of the edge portion by using a formula: $\Delta = \Delta y/\Delta x = (ye-ys)/(xe-xs)$. On the other hand, in the first case in which the absolute value of the y coordinate difference is greater than the absolute value of the x coordinate difference, the determination in step S3 allows steps S21 through S35 shown in FIG. 3B to be performed. The steps S3 and S4 and the step S21 are performed by the inclination detecting part 2 described above.

A step S5 determines whether or not a value of the device coordinate Xs of the starting point is smaller than a value of the device coordinate Xe of the end point by comparing these values. Since a value of the inclination of the edge portion is obtained in the step S4, this step S5 is intended to determine a direction in which a tracing of dots in the dot counting procedure is performed, either in a positive direction or in a negative direction of the x axis. In other words, the step S5 determines whether a variable X on the edge portion should be incremented or decremented by comparing the values. If the value of the Xs is smaller than the value of the Xe, a step S6 sets an increment "a" to 1. This increment "a" is repeatedly added to the variable X on the edge portion. The increment "a" hereinafter is expressed in integer number "1" or "$-1$". In this case, the tracing of dots is performed in the positive direction of the x axis by incrementing the variable X by the value one. If the value of the Xs is greater than the value of the Xe, a step S7 sets the increment "a" to $-1$. In such a case, the vector data having a negative direction with respect to the x axis is given and the tracing of dots is performed in the negative direction of the x axis.

After the increment "a" is set, a step S8 sets a length count L to zero "0" and sets the variable X to the value of the Xs as the initial values. The length count L, which is repeatedly incremented by the value one "1", indicates the number of successive dots in a horizontal direction or in a vertical direction. The length count L is provided for the dot counting part 3 to count the number of such successive dots. The steps S9 through S15 in FIG. 3A (or the steps S26 through S32 in FIG. 3B) are performed by the dot counting part 3 of FIG.2.

A step S9 determines whether or not the value of the variable X is equal to the device coordinate "Xe" of the end point of the edge portion. The subsequent steps S10 through S18 are repeated until the variable X is equal to the value "Xe" of the end point of the edge portion. If X=Xe, the image processing process ends.

A step S10 calculates the integer value of the device coordinate Y1 with respect to a first point (X, Y1) on the edge portion of the vector data, and calculates the integer value of the device coordinate Y2 with respect to a second point (X+a, Y2) thereon. To obtain the value of x coordinate (X+a) of the second point, the variable X indicating the value of the x coordinate of the first point is incremented by "a". The values of Y1 and Y2 are calculated as follows.

$$Y1 \equiv \Delta \cdot X + (xe\ ys - xs\ ye)/(xe-xs)$$

$$Y2 \equiv \Delta \cdot (X+a) + (xe\ ys - xs\ ye)/(xe-xs) \quad (1)$$

By using the result of the calculation in the step S10, a step S11 determines whether or not the integer value of Y2 for the second point (X+a, Y2) is equal to the integer value of Y1 for the first point (X, Y1). The step S3 determined that the inclination of the edge portion lies between $-45$ deg and $+45$ deg with respect to the horizontal direction. It should be noted that there are two cases regarding the integer values of Y1 (the first point) and Y2 (the second point). In one case, the integer value of Y1 is equal to the integer value of Y2, and, in the other case, the integer value of Y2 is different from the integer value of Y1. For example, when the integer values of Y1 and Y2 are calculated with respect to intersections between the vector data and the vertical lines cx1 and cx2 in FIG. 7B (cx1 indicates x coordinate "X" of the first point and cx2 indicates x coordinate "X+a" of the second point), the integer values of Y1 and Y2 are the same integer value as indicated by the horizontal line cy1 in FIG. 7B. However, when the integer values of Y1 and Y2 are calculated with respect to intersections between the vector data and the vertical lines cx4 and cx5 in FIG. 7B, the integer value of Y2 (as indicated by the cy2) is different from the integer value of Y1 (indicated by the cy1).

When the value of Y2 is equal to the value of Y1, it means that the edge portion in a range between X and (X+a) has a value of the y coordinate which is the same as the current horizontal line and the integer value of Y2 for the second point remains unchanged from the integer value of Y1 for the first point. A step S12 increments the value of the length count L into (L+1) and increments the value of the variable X into (X+a). The number of successive horizontal dots is counted with the value of the length count L because the length count L is repeatedly incremented until the integer value of Y2 becomes different from the integer value of Y1.

On the other hand, when it is determined in step S11 that the value of Y2 is not equal to the value of Y1, the integer value of the y coordinate of the second point is different from the integer value of the y coordinate of the first point. A step S13 produces a set of successive horizontal dots in the output device, the set of successive horizontal dots having a length equivalent to the length count L supplied by the dot counting part 3.

A step S14 determines whether or not the value of the length count L is greater than a predetermined length Lref. In this embodiment, the predetermined length Lref is equal to 4. If the length count L is not greater than the length Lref, a step S15 is performed without performing the anti-aliasing process. In this case, the edge portion is smoothly inclined enough to determine that the outline of the image is already visually smooth, and that it is not necessary to perform the anti-aliasing process for removing stair-like irregularity. The step S15 increments the integer value of Xs into (X+a), and substitutes the value of (X+a) for the variable X. The foregoing steps are repeated with respect to a new edge portion indicated by the value (X+a) for the variable X.

On the other hand, if the step S14 determines that the length count L is greater than the length Lref (=4), the anti-aliasing process is performed in step S16. In this case, the inclination of the edge portion is too small, and it is necessary to eliminate the stair-like irregularity lying in the vertical direction from the edge portion. After the anti-aliasing process is completed, a step S17 performs the same process as in the step S15 to increment the integer value of Xs into (X+a), and substitute the value of (X+a) for the variable X. A step S18 resets the value of the length count L to zero, and the foregoing steps S10 through S18 are repeated until the value of the variable X is equal to the value of Xe.

Next, a description will be given of the anti-aliasing process performed in the step S16 of FIG. 3A (or the step S33 of FIG. 3B), with reference to FIGS. 4 and 6.

FIG. 4 shows the anti-aliasing process according to the present invention. FIG. 6 shows a set of correction dots produced in the anti-aliasing process performed in the step S16 of the process shown in FIG. 3A (or, the step S33 shown in FIG. 3B). The set of correction dots produced in the anti-aliasing process is added to the set of successive horizontal dots having previously been produced in the step S13 of FIG. 3A so as to generate a visually smooth outline of the image.

Figure 6:
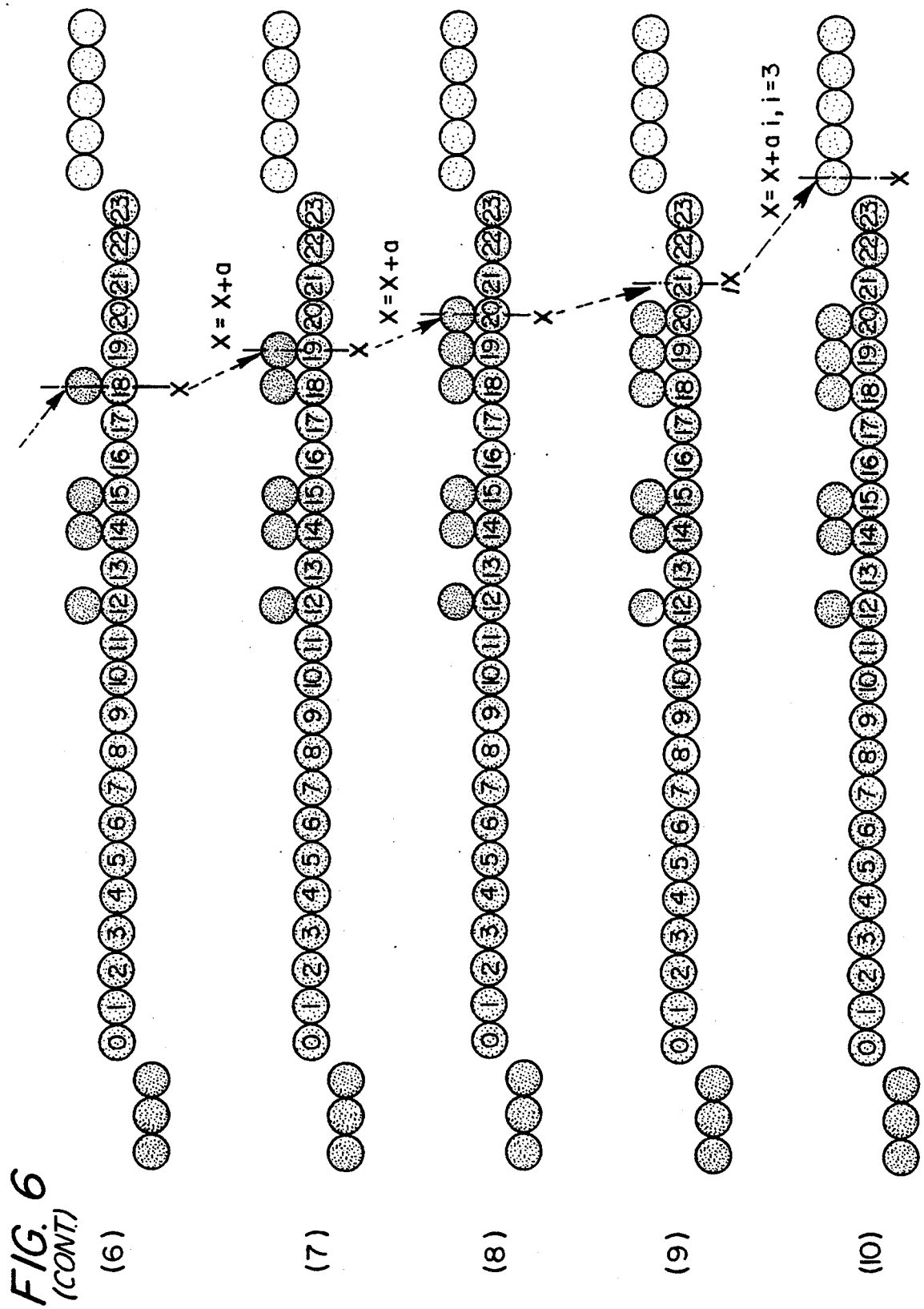
FIG. 6 is a diagram showing a set of correction dots produced in the anti-aliasing process of FIG. 4.

FIG. 6 shows a set of correction dots to be added to the edge portion of the input image data (the vector data), the set of correction dots being newly produced in the output device when the anti-aliasing process in the step S16 of FIG. 3A is performed according to the flow chart shown in FIG. 4. For the sake of convenience, it is assumed, in the case of FIG. 6, that the vector data includes a starting point of the edge portion at its lower left end and an end point thereof at its upper right end, and that the length count L at this time is equal to 24 (the steps S9 through S12 are repeated 24 times) and the increment "a" is always equal to 1. In FIG. 6 (1) through (10), the set of successive dots having been previously produced and drawn is indicated by black dots, the set of successive dots having just been produced in the step S13 of FIG. 3A is indicated by shaded dots (the 0th through 23th dots aligned in the horizontal line at Y2), and a set of successive dots still not produced (because Y2 is not equal to Y1) is indicated by white dots. The value of the starting point Xs at this time is zero, which indicates the value of the x coordinate of a center point of the 0-th dot.

According to the invention, it is necessary to first determine the integer number "n" so as to satisfy the following formula:

$$L/2 \geq n(n+1) \quad (L: \text{length count}) \qquad (2)$$

This integer number "n" is determined as being the maximum integer number that satisfies the formula (2). For example, in the case of FIG. 6, the value of the length count L is equal to 24, and the integer number "n" is determined as being equal to 3 ($n \geq 3$).

In the flow chart shown in FIG. 4, a step T1 determines the integer number "n" by the following formula (3) which can readily be obtained from the formula (2).

$$n = \text{INT} [(-2 + \sqrt{4 + 8L})/4] \qquad (3)$$

By means of this formula (3), the integer number "n" is determined depending on the value of the length count L. More specifically, according to the formula (3), a value of square root of (4+8L) is calculated, and 2 is subtracted from the calculated value of the square root. The value of the resultant difference is divided by 4, and the value of the resultant quotient is rounded off into an integer. The sign "INT" in the formula (3) represents an operation of truncation of a real number data to an integer, and the real number data is rounded by truncating the decimal fraction. The resultant data of this truncation is the integer number "n". For example, when the length count "L" is equal to 24 (in the case of FIG. 6), the integer number "n" is determined as being 3 according to the formula (3).

A step T2 determines whether the aliasing of the edge portion lies in the horizontal direction (in the x axis direction) or in the vertical direction (in the y axis direction) by comparing the absolute value of the difference $\Delta x$ (=xe−xs) with the absolute value of the difference $\Delta y$ (=ye−ys). This step T2 is the same as the step S3 of FIG. 3A. In the case of FIG. 6, the affirmative answer to the step T2 is taken because the absolute value of the difference $\Delta x$ is greater than the absolute value of the difference $\Delta y$, and the steps T3 through T9 are performed. If the negative answer is taken, a different procedure consisting of steps T11 through T17 is performed.

A step T3 determines the value of the x coordinate of a starting point of the set of correction dots produced in the anti-aliasing process as follows.

$$X = Xs + a(L - n(n+1)) \qquad (4)$$

In the case of FIG. 6, the value of the x coordinate of the starting point is equal to (0+24−3×4)=12. The starting point is first located at the center of the successive horizontal dots. A step T4 sets the value of a first counter i to 1 as an initial value. A step T5 checks whether or not the value of the first counter i is greater than the value of n. The following steps T6 through T9 are repeated until when i>n. If i>n, the anti-aliasing process ends. If i≤n, a step T6 sets the value of a second counter j to 1 as an initial value, and a step T7 checks whether or not the value of the second counter j is greater than the value of the first counter i. The following step T8 is repeated until when j>i. If j≤i, the step T8 newly produces a correction dot at a position indicated by x and y coordinates (X, Y2) in the output device, and then the step T8 increments the value of the variable X to (X+a), and increments the value of the second counter j into (j+1). If the step T7 determines that the value of j is greater than the value of i (j>i), a step T9 sets the value of the variable X into (X+ai) and increments the value of i into (i+1).

For example, in the case of FIG. 6, the increment "a" is set to 1 in the step S6 of FIG. 3A since the value of Xs is smaller than the value of Xe, and the value of the variable X is set to 12 in the step T3 since Xs=0, L=24, n=3. A correction dot is first produced at (12, Y2) in the step T8 as shown in FIG. 6 (1). The value of the second counter j is incremented into 2 in the step T8, and the variable X and the first counter i are incremented in the step T9 after j>i. The step T8 is repeated twice, so that two correction dots are newly produced at (14, Y2) and (15, Y2) respectively, as shown in FIG. 6 (5). The value of the second counter j is incremented twice into 3 in the step T8, and the variable X and the first counter i are incremented twice in the step T9 after j>i. The step T8 is repeated three times, so that three successive correction dots are newly produced at (18, Y2), (19, Y2) and (20, Y2) respectively as shown in FIG. 6 (8). The value of the second counter j is incremented three times into 4, and the variable X is incremented three times, and the first counter i is set to 3. Finally, in the step T9, the first counter i is incremented into 4, and the step T5 determines that the value of the first counter i is greater than the prescribed integer number "n" and the anti-aliasing process of FIG. 4 ends, as shown in FIG. 6 (10). Therefore, the set of correction dots is added to the edge portion of the input image data so that a visually smooth outline of an image is produced in the output device.

When the step S3 of FIG. 3A determines that the inclination of the edge portion lies between 45 deg and 135 deg (or, between 225 deg and 315 deg) with respect to the horizontal direction (the x-axis direction) as shown in FIG. 8A, the steps S21 through S35 shown in FIG. 3B are performed. In the step S27, values of the device coordinates X1 and X2 are calculated as follows:

$$X1 \equiv \Delta \cdot Y + (xe\ ys - xs\ ye)/(xe - xs)$$

$$X2 \equiv \Delta \cdot (Y + a) + (xe\ ys - xs\ ye)/(xe - xs) \quad (1)$$

A procedure of the steps S21 through S35 is similar to the above described procedure of the steps S4 through S18 except the variable Y is substituted for the variable X. Therefore, a description thereof will be omitted.

Also, in this case, the step T2 of FIG. 4 also determines that the inclination lies between 45 deg and 135 deg (or, between 225 deg and 315 deg) with respect to the horizontal direction, and the steps T11 through T17 are performed. In the step T11, a value of the y coordinate of a starting point (the variable Y) of a set of vertical correction dots is produced in the anti-aliasing process as follows:

$$Y = Ys + a(L - n(n+1)) \quad (5)$$

A procedure of the steps T11 through T17 is similar to the above described procedure of the T3 through T9 except the variable Y is substituted for the variable X, and a description thereof will be omitted.

A multi-level tone image data is not used for smoothing an outline of an image in the case of the present invention. And, a complicated image data control technique required for the conventional apparatus is no longer needed by the image processing apparatus of the present invention. According to the present invention, it is possible to eliminate a stair-like irregularity or aliasing from an edge portion of an image so that a visually smooth outline is produced. The number of successive dots indicated by the count length L which is counted in accordance with the inclination of the edge portion is detected, a correction dot pattern is produced on the basis of the detected number of successive dots, and the edge portion having the aliasing is corrected by adding the correction dot pattern to the edge portion, thus producing a visually smooth outline of the image.

Further, the present invention is not limited to the above embodiment, and variations and modifications may be made without departing from the scope of the present invention.

What is claimed is:

1. An apparatus for smoothing an outline of an image including a plurality of dots, the apparatus comprising:
   A) detection means for quantitatively measuring a degree of inclination of an outline with respect to a predetermined direction, and for outputting a measured quantitative inclination of the outline;
   B) dot counting means, responsive to the measured quantitative inclination supplied from the detection means, for selectively calculating:
      a) the number of successive dots aligned along a horizontal line and ending with a change of one dot in a vertical direction; or
      b) the number of successive dots aligned along a vertical line and ending with a change of one dot in a horizontal direction; and
   C) correction means, responsive to the dot counting means, the correction means including:
      a) means for generating a plurality of correction dots at locations determined by the calculated number of successive dots:
         1) along a new horizontal line lying immediately above or below said horizontal line; or
         2) along a new vertical line lying immediately to the left of or immediately to the right of said vertical line;
      wherein the means for generating a plurality of correction dots includes:
         1) means for arranging the plurality of correction dots as a plurality of sets of dots, which sets of dots are placed along either the new horizontal line or the new vertical line, sets of dots being separated from other sets of dots by different intervals; and
      b) means for supplying said plurality of correction dots to an output memory so as to produce a visually smooth outline of the image data in the output memory.

2. An apparatus according to claim 1, wherein the means for generating a plurality of correction dots includes:
   a) means for varying both:
      1) the number of dots included in each said set of dots, and
      2) the values of the intervals between different sets of dots,
   in ascending order from a dot at the center of the successive dots to an end dot thereof.

3. An apparatus according to claim 2, wherein the means for varying includes:
   means for starting both the number of said dots in each set, and the value of said intervals, from a value of 1.

4. An apparatus according to claim 1, wherein said plurality of correction dots supplied to the output memory have the same resolution as said successive dots supplied to the output memory.

5. An apparatus according to claim 1, wherein said correction means generates the plurality of correction dots after it is determined that the calculated number of successive dots is greater than a predetermined integer number.

6. An apparatus according to claim 1, further comprising coordinates receiving means including:

means for receiving two sets of x and y coordinates of a starting dot and an end dot which are included in the outline from the image data stored in said output memory; and means for supplying two sets of transformed x and y coordinates of the starting dot and the end dot to the detection means.

7. An apparatus according to claim 6, wherein:

said coordinates receiving means includes means for transforming the received two sets of x and y coordinates into two sets of output device coordinates; and said output device coordinates are expressed in integer numbers and have a resolution corresponding to a resolution of said output memory.

8. The apparatus of claim 1, wherein the correction means' means for supplying said plurality of correction dots includes:

means for supplying said plurality of correction dots to the output memory in response to a condition when the calculated number of successive dots is at least a value of four.

* * * * *